(12) United States Patent
Kang et al.

(10) Patent No.: US 7,657,641 B2
(45) Date of Patent: Feb. 2, 2010

(54) MEGACO PROTOCOL MANAGEMENT METHOD USING NETWORK ADAPTOR

(75) Inventors: Tae-Gyu Kang, Daejon (KR); Seung Han Choi, Daejon (KR); Do Young Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1035 days.

(21) Appl. No.: 10/639,904

(22) Filed: Aug. 12, 2003

(65) Prior Publication Data

US 2004/0122982 A1 Jun. 24, 2004

(30) Foreign Application Priority Data

Dec. 24, 2002 (KR) .................. 10-2002-0083601

(51) Int. Cl.
*G06F 15/16* (2006.01)
(52) U.S. Cl. .................. 709/230; 370/351; 370/466; 379/16; 379/17
(58) Field of Classification Search .......... 709/230, 709/223, 238; 370/352, 410, 466, 230, 401; 379/88.16
See application file for complete search history.

(56) References Cited

U.S. PATENT DOCUMENTS

| 6,404,746 | B1  |   | 6/2002  | Cave et al. |              |
|-----------|-----|---|---------|-------------|--------------|
| 6,446,127 | B1  |   | 9/2002  | Schuster et al. |          |
| 6,456,594 | B1  |   | 9/2002  | Kaplan et al. |            |
| 6,658,476 | B1  | * | 12/2003 | Van ..................... | 709/230 |
| 6,697,852 | B1  | * | 2/2004  | Ryu ..................... | 709/220 |
| 6,888,839 | B1  | * | 5/2005  | Scoggins et al. ......... | 370/410 |
| 6,888,937 | B1  | * | 5/2005  | Kurapati ............. | 379/265.02 |
| 6,910,074 | B1  | * | 6/2005  | Amin et al. ............. | 709/227 |
| 7,058,082 | B1  | * | 6/2006  | Bhat et al. ............. | 370/466 |
| 7,120,139 | B1  | * | 10/2006 | Kung et al. ............. | 370/352 |
| 7,194,071 | B2  | * | 3/2007  | Rupsis ............... | 379/88.16 |
| 7,206,825 | B1  | * | 4/2007  | Sauriol et al. .......... | 709/220 |
| 7,277,387 | B2  | * | 10/2007 | Sanders et al. .......... | 370/230 |
| 2003/0231639 | A1 | * | 12/2003 | Mikkola .............. | 370/401 |
| 2004/0024902 | A1 | * | 2/2004  | Mikkola .............. | 709/238 |

FOREIGN PATENT DOCUMENTS

| EP | 1202530 | 5/2002 |
|----|---------|--------|
| JP | 2002-359653 | 12/2002 |

OTHER PUBLICATIONS

RFC 3015- Megaco Protocol Version 1., Nov. 2000, F. Cuervo, pp. 14,58-60.*
RFC 3015- Megaco Protocol Version 1., Nov. 2000, F. Cuervo, pp. 14,58-60.*
MGCP/Megaco VoIP, pp. 82-89.

* cited by examiner

*Primary Examiner*—Dustin Nguyen
(74) *Attorney, Agent, or Firm*—Blakely, Sokoloff, Taylor & Zafman

(57) ABSTRACT

The present invention manages media gateway control (megaco) protocols according to changes of lower layer network protocol by implementing the megaco package in the network adaptor. A method for managing the megaco protocols by using a network adaptor includes steps of: a) requesting an installation of a megaco protocol package to a network adaptor; b) determining whether the megaco protocol exists in a network protocol table; c) adding a new protocol in the network protocol table; d) searching a specific megaco protocol package in the megaco protocol package list by using the specific package ID and connecting the specific megaco protocol package; and e) installing the megaco protocol packages and the specific megaco protocols, and managing the megaco protocols.

7 Claims, 5 Drawing Sheets

FIG. 4

| ,411 | ,412 | ,413 | ,414 |
|---|---|---|---|
| PROTOCOL ID | PROTOCOL VERSION INFORMATION | COMPANY INFORMATION | SPECIFIC PACKAGE ID |

NETWORK PROTOCOL TABLE ~410

| ,421 | ,422 | ,423 | ,424 | ,425 | ,426 | ,427 |
|---|---|---|---|---|---|---|
| PACKAGE ID | PACKAGE VERSION INFORMATION | PROPERTY INFORMATION | EVENT PARAMETER | SIGNAL PARAMETER | STATISTIC INFORMATION | SPECIFIC PROTOCOL ID |

MEGACO PACKAGE LIST ~420

MEGACO PROTOCOL MANAGEMENT METHOD USING NETWORK ADAPTOR

FIELD OF THE INVENTION

The present invention relates to a media gateway control (megaco) protocol management method using a network adaptor, and more particularly, to a megaco protocol management method for independently managing the megaco protocols according to changes of low level network protocols by implementing the megaco package in the network adaptor and a computer readable recording medium for executing the same method.

DESCRIPTION OF THE PRIOR ART

A Voice over Internet Protocol (VoIP) is an application technology of the Internet for transferring voice data that is compressed and packetized by end-to-end channel setting base upon Internet Protocol (IP) address. A gateway is necessary so as to provide VoIP through the Internet and terminates Public Switched Telephone Network (PSTN). The gateway is an apparatus for interconnecting signals and media between two networks.

The VoIP is connected to a Signaling Gateway (SG) by a media gateway controller for controlling a call process. The media gateway controller controls the media gateway by translating a call number, allocates available Internet Protocol (IP) address by controlling the media gateway and interconnects voice traffics of each terminal by managing compression methods to generate end-to-end IP packet.

By separating the media gateway and the signal gateway, independence of an applied protocol is guaranteed, protocol is scalable and service can be easily changed although a new service is added.

A gateway is functionally divided into a signal gateway, a media gateway and a media gateway controller. The media gateway transforms data that are used in circuit switching network into data that are used in packet switching network. The media gateway includes a Residential Gateway (RGW), an Access Gateway (AGW) and a Trunk Gateway (TGW).

A media gateway control (megaco) protocol is used for communication between the media gateway and the media gateway controller in VoIP service. The megaco protocol defines a communication method between the media gateway and the media gateway controller and is a protocol in master-slave format that the media gateway controller sends instructions for connecting and managing media gateways. Traffic processing of the media gateway is similar to that of node in typical switch.

Also, a megaco protocol engine supports communication between the media gateway and the media gateway controller by using the megaco protocol. The megaco protocol engine is interconnected to many low level network protocols, e.g., a Transmission Control Protocol (TCP), a User Datagram Protocol (UDP), Stream Control Transmission Protocol (SCTP), an Asynchronous Transfer Mode (ATM) and Time Division Multiplexer (TDM).

New version of the protocol has been developed day by day. As a result, the number of the protocols for being considered by the megaco protocol engine in order to be matched is incredibly increased. Therefore, a source of the megaco protocol engine must be revised whenever the megaco protocol engine is installed according to changes of network protocols or protocol versions.

SUMMARY OF THE INVENTION

It is, therefore, an object of the present invention to provide a megaco protocol management method for independently managing the megaco protocols according to changes of low level network protocols by implementing the megaco package in the network adaptor and a computer readable recording medium for executing the same method.

In accordance with an aspect of the present invention, there is provided a method for managing media gateway control (megaco) protocols by using a network adaptor, including steps of: a) requesting an installation of a megaco protocol package of low level network protocols to a network adaptor; b) determining whether the megaco protocol exists in a network protocol table; c) adding a new protocol in the network protocol table in case that the megaco protocol does not exist in the network protocol table; d) searching a specific megaco protocol package in the megaco protocol package list by using the specific package ID and connecting the specific megaco protocol package in case that the megaco protocol exists in the network protocol table; and e) installing the megaco protocol packages and the specific megaco protocols and managing the megaco protocols.

In accordance with another aspect of the present invention, there is provided a computer readable recording medium including a microprocessor in communication systems using a megaco protocol, including the instructions of: a) requesting an installation of a megaco protocol package of low level network protocols to a network adaptor; b) determining whether the megaco protocol exists in a network protocol table; c) adding a new protocol in the network protocol table in case that the megaco protocol does not exist in the network protocol table; d) searching a specific megaco protocol package in the megaco protocol package list by using the specific package ID and connecting the specific megaco protocol package in case that the megaco protocol exists in the network protocol table; and e) installing the megaco protocol packages and the specific megaco protocols and managing the megaco protocols.

BRIEF DESCRIPTION OF THE DRAWINGS

The above and other objects and features of the present invention will become apparent from the following description of the preferred embodiments given in conjunction with the accompanying drawings, in which:

FIG. 4 shows a network protocol table and a megaco package list in accordance with an embodiment of the present invention;

DETAILED DESCRIPTION OF THE PREFERRED EMBODIMENTS

Figure 1:
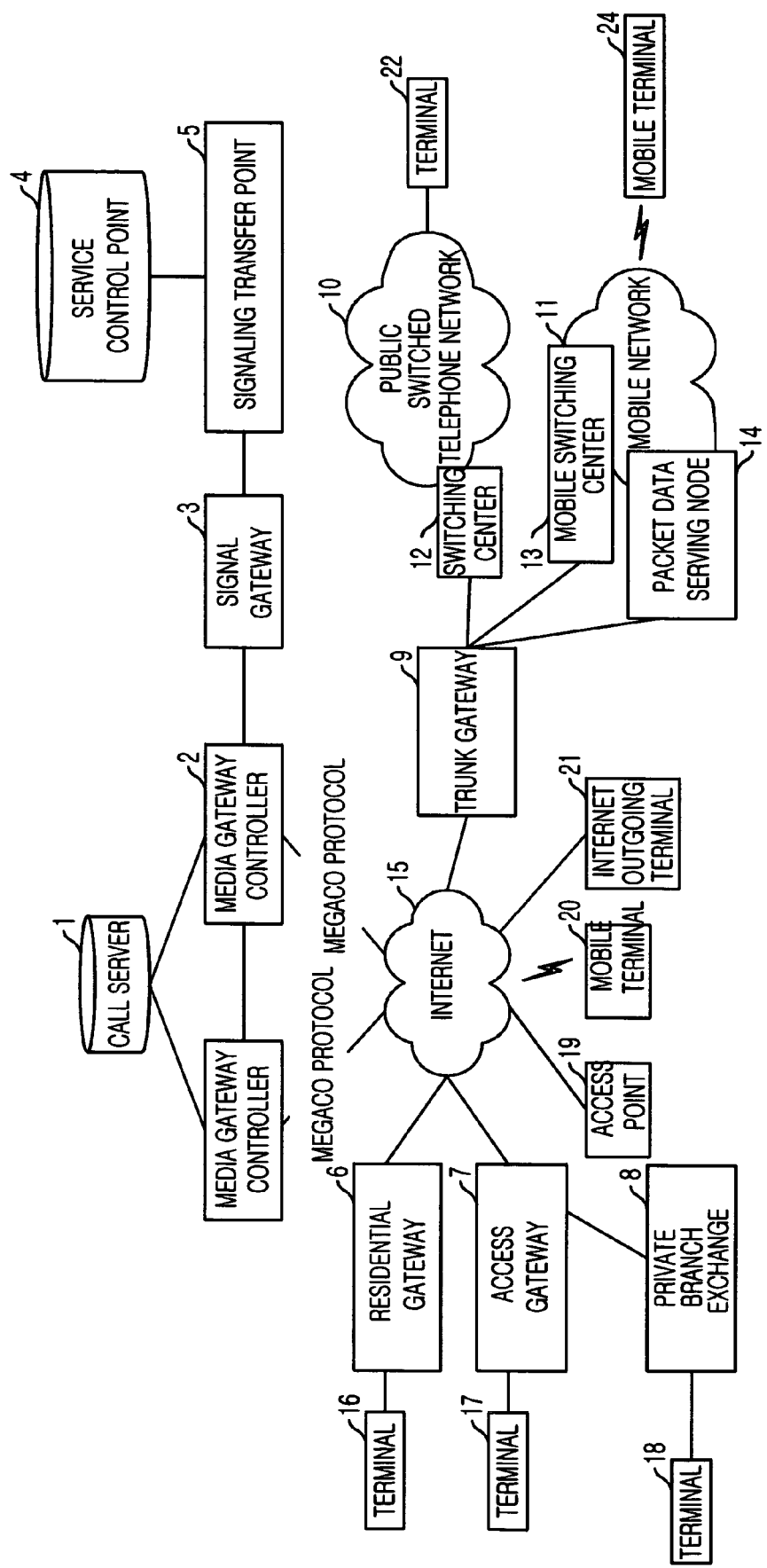
FIG. 1 is an exemplary block diagram showing a Voice over Internet Protocol (VoIP) service system in accordance with the present invention.

FIG. 1 is an exemplary block diagram showing a Voice over Internet Protocol (VoIP) service system in accordance with the present invention.

A media gateway control (megaco) protocol is the protocol used in the Internet. It is distinguished from a protocol used in a Public Switched Telephone Network (PSTN). A call processing unit and a media processing unit were built on one device for the PSTN and the mobile network. However, the call processing unit and the media processing unit are separately implemented as an independent device for the Internet network by standardization of the megaco protocol. Such a separation of call processing unit and media processing unit makes it possible to expand media transfer device for expanding the network.

Referring to FIG. 1, the terminals include an Internet outgoing terminal 21, a wireless terminal 20 connected to an access point 19 over the air, a terminal 16 connected to a Residential Gateway (RGW) 6, a terminal 17 connected to an Access Gate (AGW) 7 and a terminal 18 connected to a Private Branch Exchange (PBX) 8. The terminal connected to the Internet requests an Internet voice telephone service.

The request is transferred to a call server 1 through a media gateway controller 2. Internet telephone call is connected to the PSTN 10 or the mobile network 11 through a Signal Gateway (SG), a Signaling Transfer Point (STP) and a Service Control Point (SCP).

Once the Internet telephone call is connected, the Media Gateway Controller (MGC) 2 controls a Trunk Gateway (TGW) 9 by using the megaco protocol to deliver the call to the terminal of the PSTN or the mobile network through a switch 12, a Mobile Switching Center (MSC) 13 or a Packet Data Serving Node (PDSN) 14.

Figure 2:
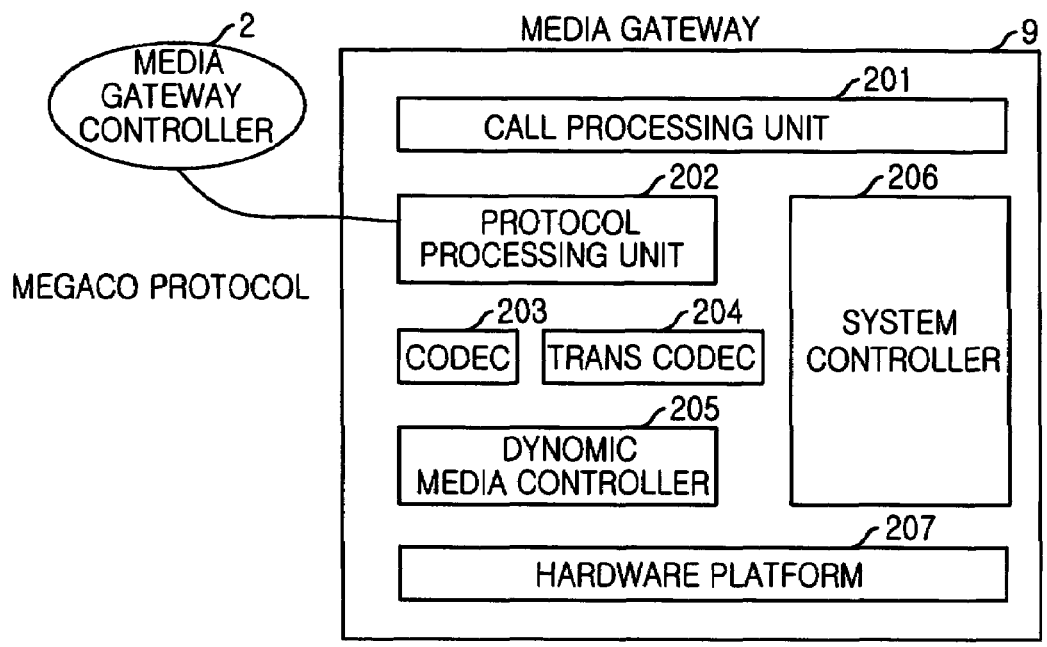
FIG. 2 is an exemplary block diagram illustrating a media gateway in accordance with the present invention.

FIG. 2 is an exemplary block diagram illustrating a media gateway in accordance with the present invention.

Referring to FIG. 2, a media gateway 9 includes a call processing unit 201 for processing calls from a transmitting channel and a receiving channel, a protocol processing unit 202 for processing protocols, e.g., a megaco protocol, a system controller 206 for controlling a media gateway system, a codec 203 for transforming an analog voice signal to a digital voice signal, a trans-codec for transforming a different format of codec to an adequate format of codec, a dynamic media controller 205 for allocating and controlling voice codec data in Real-time Transport Protocol (RTP) payload and a hardware platform for providing a hardware for operating the media gateway 9.

A media gateway control protocol engine is included in a protocol processing unit 202 of media gateway. The media gateways 6, 7 and 9 communicate with a media gateway controller 2 by using a media gateway control (megaco) protocol.

Figure 3:
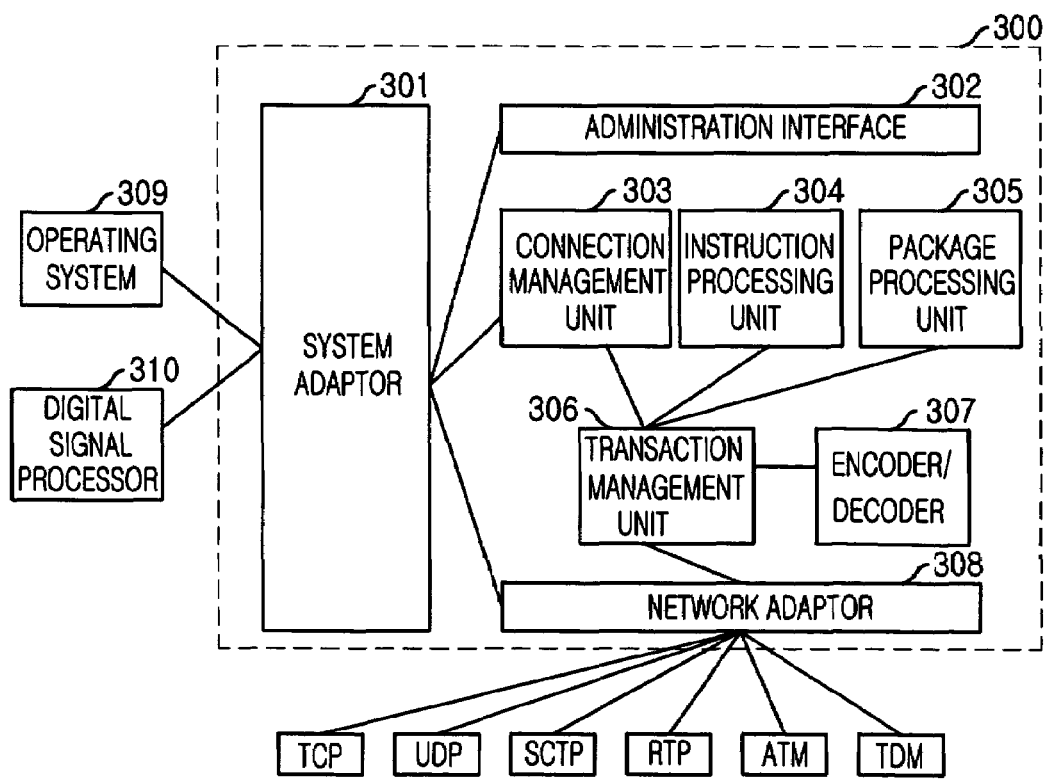
FIG. 3 is an exemplary block diagram depicting a media gateway control (megaco) protocol engine in accordance with the present invention.

FIG. 3 is an exemplary block diagram showing a megaco protocol engine in accordance with the present invention.

Referring to FIG. 3, a megaco protocol engine 300 includes a connection management unit 303 for managing a connection between a transmitter and a receiver, an instruction processing unit 304 for processing instructions, a package processing unit 305 for processing a megaco protocol package, a transaction management unit 306 for managing a transaction for call processing, a encoder/decoder for encoding and decoding the megaco protocol, a network adaptor 308 for interconnecting network protocols, an administration interface 302 for providing an interface in order to manage the megaco protocol, an Operating System (OS) 309 and a system adaptor 301 for connecting a Digital Signal Processor (DSP) 310.

Particularly, the network adaptor 308 interconnects various low level network protocols including a Transmission Control Protocol (TCP), a User Datagram Protocol (UDP), Stream Control Transmission Protocol (SCTP), an Asynchronous Transfer Mode (ATM) and Time Division Multiplexer (TDM).

FIG. 4 shows a network protocol table and a megaco package list in accordance with an embodiment of the present invention.

The network adaptor 308 needs a network protocol table 410 and a megaco package list 420 to install the megaco protocol package to the low level network protocols.

The protocol information table (Network_Protocol_table) 410 is used for managing the megaco protocol according to characteristics of low level network protocol such as TCP, UDP or SCTP.

Referring to FIG. 4, the network protocol table 410 includes protocol identification (ID) 411, protocol version information 412, company information 413 and specific package ID 414.

The protocol ID 411 is an identification defined for discriminating a target network protocol to be interconnected by the megaco protocol engine. Examples of the protocol IDs are defined as 0001 for UDP, 0002 for TCP, 0003 for SCTP, 0004 for RTP, 0005 for ATM and 0006 for TDM in a preferred embodiment of this present invention.

Protocol version information 412 represents a version of the protocol defined by the protocol ID 411. Examples of the protocol version information 412 are defined as 01 for version 1, 02 for version 2 and 03 for version 3 in a preferred embodiment of this present invention.

Company information 413 is used for requesting specific megaco protocol in case that protocol standard is not defined or a protocol is developed regardless with the protocol standard. Examples of the company information 413 are defined as 0001 for company 1, 0002 for company 2, 0003 for company 3 and 0004 for company 4 in a preferred embodiment of this present invention.

The specific package ID 414 is an identification of a megaco protocol package in a megaco package list 420. The specific package ID 414 corresponds to package identification (ID) 421 of the megaco package list 420. That is, the specific package ID 414 is used as an identification of the megaco protocol package that is installed in the megaco package list 420.

Regardless of adding or updating of a new low level network protocol, the megaco protocol package is independently installed in the megaco protocol engine by using the network protocol table 410 that has the protocol ID 411, the protocol version information 412 and the company information 413.

The megaco package list 420 includes package ID 421, package version information 422, property information 423, event information 424, signal parameter 425, statistic information 426 and specific protocol ID 427 for defining other characteristics of megaco protocol package.

The package ID 421 is an identification of the megaco protocol package. The package version information 422 defines changes of the property information 423, the event information 424, the signal parameter 425, the statistic information 426 and the special protocol ID 427.

The property information 423 defines data type. Examples of the property information 423 are string, UTF-8 string, integer, 4 byte signed integer, double, 4 byte signed integer, character, enumeration, sub-list and Boolean.

The event information 424 is used for the media gateway controller 2. The signal parameter 425 is an identification of information between the media gateway controller 2 and the media gateway.

The statistic information 426 represents a unit, e.g., a second or a packet.

The specific protocol ID 427 is an identification of a specific protocol.

Management procedures of the megaco protocol in accordance with the present invention are explained by using the network protocol table and the megaco package list.

Figure 5:
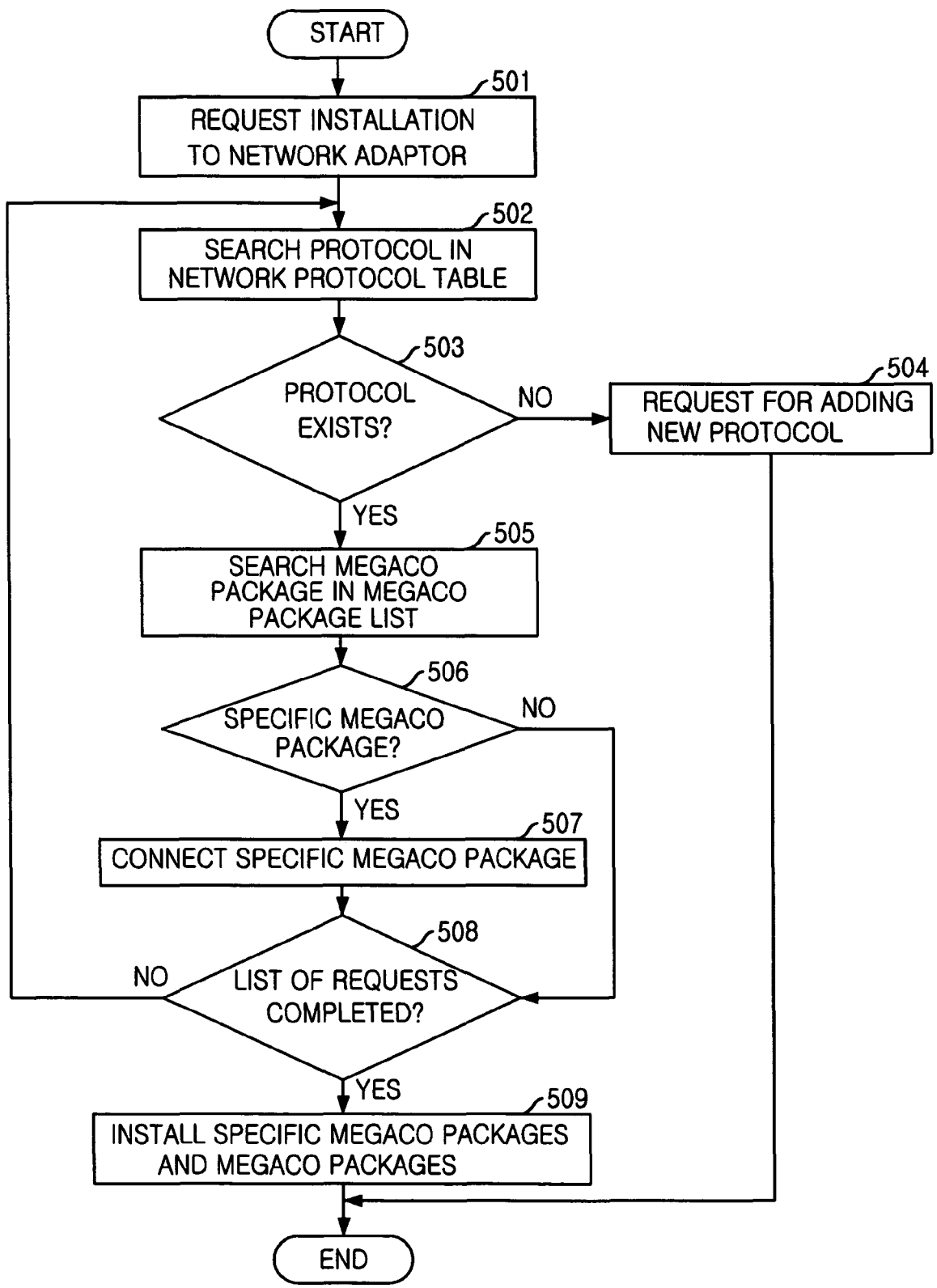
FIG. 5 is a flowchart for explaining management procedures of the megaco protocol by using a network adaptor in accordance with the embodiment of the present invention.

FIG. 5 is a flowchart showing management procedures of the megaco protocol by using a network adaptor in accordance with the embodiment of the present invention.

At step 501, the media gateway 9 receives a list of requests for installing package from the media gateway controller 2 and requests an installation of the megaco protocol package to the network adaptor 308.

At step 502, the network adaptor 308 receives the request for installing the megaco protocol package and searches a protocol of the list in the network protocol table 410 that has fields of the protocol ID 411, the protocol version information 412 and the company information 413. At step 503, it is determined whether the protocol exists in the network protocol table 410.

If the protocol does not exist in the network protocol table 410 at step 503, at step 504, a new protocol is added in the network protocol table 410 and the management procedure is finished.

If the protocol exists in the network protocol table 410 at step 503, at step 505, the specific package ID 414 is extracted from the network protocol table 410 and the network adaptor 308 searches the megaco protocol package in the megaco protocol package list 420 by using the specific package ID 414. At step 506, it is determined whether the searched megaco protocol package is the specific megaco protocol package by using the specific protocol ID 427 of the megaco protocol package list 420.

If the searched megaco protocol package is not the specific megaco protocol package at step 506, the process proceeds to step 508.

If the searched megaco protocol package is the specific megaco protocol package at step 506, at step 507, the specific megaco protocol package is connected.

At step 508, it is determined whether every protocol of the list is processed completely. If every protocol in the list is not processed yet, a procedure continues to step 502.

At step 509, megaco protocol packages and specific megaco protocol packages are installed.

Figure 6:
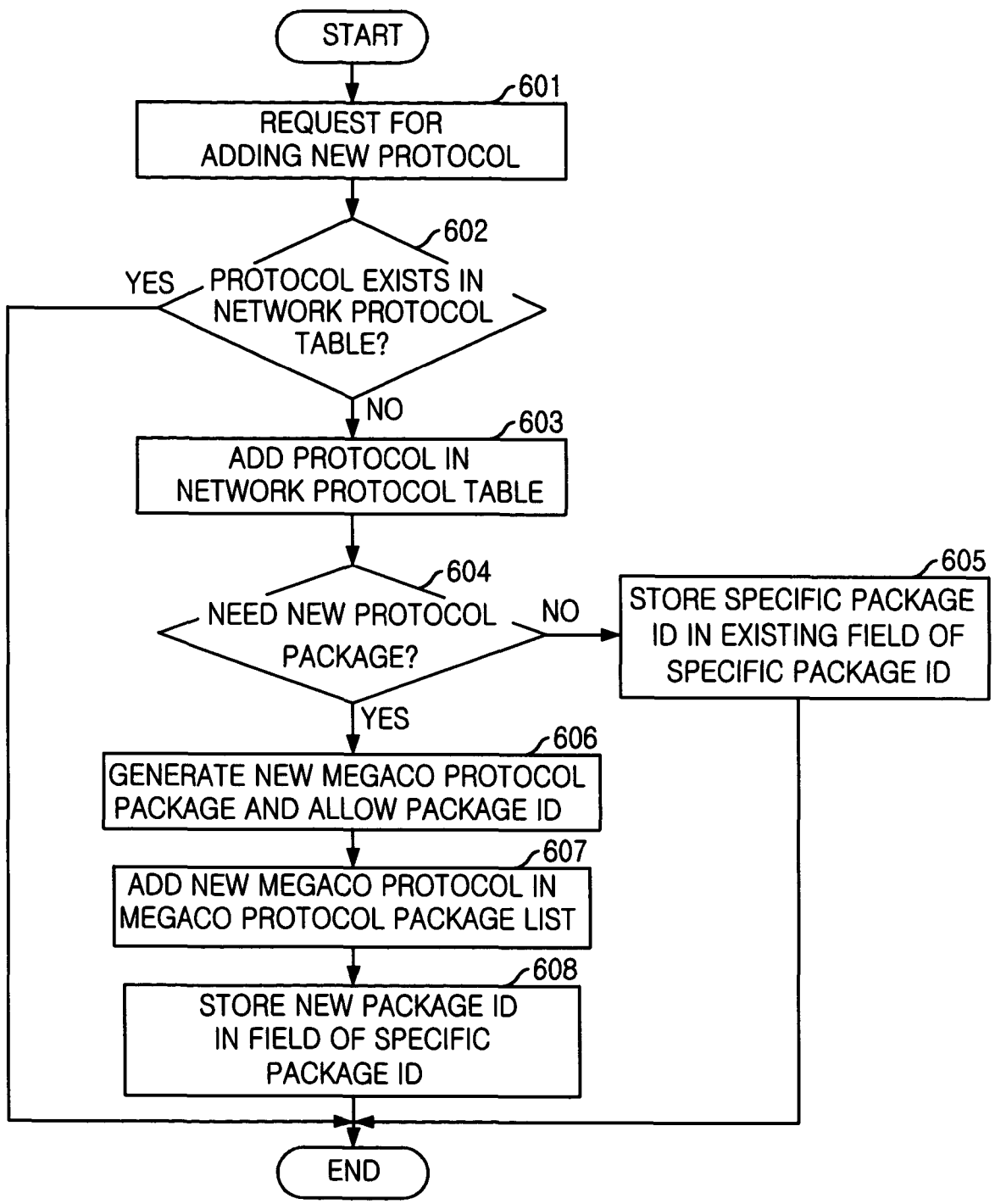
FIG. 6 is a flowchart for explaining procedures for adding a new protocol in the network protocol table by using a network adaptor in accordance with the embodiment of the present invention.

FIG. 6 is a flowchart showing procedures for adding a new protocol in the network protocol table by using a network adaptor in accordance with the embodiment of the present invention.

At step 601, a request for adding a new protocol in the network protocol table 410 is received. At step 602, it is determined whether the new protocol exists in the network protocol table 410.

If the new protocol exists in the network protocol table 410, the process is finished.

If the new protocol does not exist in the network protocol table 410, at step 603, fields of the protocol ID 411, the protocol version information 412 and the company information 413 is stored in the network protocol table 410.

At step 604, it is determined whether the new protocol needs a new megaco protocol package.

If the protocol does not need a new megaco protocol package, at step 605, the specific package ID is stored in the existing field of the specific package ID 414. If the protocol needs a new megaco protocol package, at step 606, a new megaco protocol package is generated, a new package ID 421 of the new megaco protocol package is allowed and the new package ID 421 is stored.

At step 607, the new megaco protocol package is added in the megaco package list 420 and each field of the megaco package list 420 is stored.

At step 608, the new package ID 421 is stored in the new specific package ID 414 of the network protocol table 410.

As mentioned above, although the number of network protocols and protocol versions has been increased, the megaco protocol can be operated by independently managing the megaco protocol according to changes of lower layer network protocol by implementing the megaco package in the network adaptor without revising the source of the megaco protocol engine.

The method of the present invention can be implemented as a program and stored in a computer readable medium, e.g., a CD-ROM, a RAM, a ROM, a Floppy Disk, a Hard Disk, and an Optical magnetic Disk.

While the present invention has been described with respect to the particular embodiments, it will be apparent to those skilled in the art that various changes and modifications may be made without departing from the scope of the invention as defined in the following claims.

What is claimed is:

1. A method for managing media gateway control (megaco) protocols by using a network adaptor, comprising the steps of:
   a) requesting an installation of a megaco protocol package of low level network protocols to a network adaptor;
   b) determining whether a megaco protocol exists in a network protocol table; wherein the network protocol table includes company information as a data field in the network protocol table for requesting a specific megaco protocol in a case that a protocol standard is not defined;
   c) adding a new protocol in the network protocol table in case that the megaco protocol does not exist in the network protocol table;
   d) searching a specific megaco protocol package in a megaco protocol package list by using a specific package ID and connecting the specific megaco protocol package in case that the megaco protocol exists in the network protocol table, wherein said step d) includes the steps of:
      d1) extracting the specific package ID from the network protocol table and searching the megaco protocol package in the megaco protocol package list by using the specific package ID,
      d2) determining whether the searched megaco protocol package is the specific megaco protocol package, and
      d3) proceeding the process to said step e) in case that the searched megaco protocol package is not the specific megaco protocol package and connecting the specific megaco protocol package in case that the searched megaco protocol package is the specific megaco protocol package; and
   e) installing the megaco protocol package and the specific megaco protocol package and managing the megaco protocol.

2. The method as recited in claim 1, wherein the network protocol table includes protocol identification (ID), protocol version information, company information and the specific package ID.

3. The method as recited in claim 2, wherein the megaco protocol package list includes package ID, package version information, property information, event information, signal parameter, statistic information and specific protocol ID.

4. The method as recited in claim 1, wherein said step c) includes the steps of:
   c1) requesting to add the new protocol in the network protocol table;
   c2) determining whether the new protocol exists in the network protocol table;
   c3) finishing the process in case that the new protocol does not exist in the network protocol table; and
   c4) adding the new protocol in the network protocol table and storing a new specific package ID of the new protocol in the network protocol table in case that the new protocol exists in the network protocol table.

5. The method as recited in claim 4, wherein said step c4) includes the steps of:
   c41) adding the new protocol package in the network protocol table;
   c42) determining whether the new protocol needs a new megaco protocol package;
   c43) storing the new protocol in the existing megaco protocol package in case that the new protocol does not need the new megaco protocol package; and
   c44) generating the new megaco protocol package, allowing a new package ID of the new megaco protocol package and storing the new package ID in a field of the package ID.

6. The method as recited in claim 5, wherein said step c43) includes the steps of:
   c431) generating the new megaco protocol package;
   c432) allocating the new package ID of the new megaco protocol package;
   c433) storing the new package ID in the field of the package ID of the megaco package list; and
   c434) storing the new package ID in a field of the specific package ID of the network protocol table.

7. A computer readable recording medium for executing a method for managing megaco protocols by using a network adaptor, comprising the functions of:
   a) requesting an installation of a megaco protocol package of low level network protocols to a network adaptor;
   b) determining whether a megaco protocol exists in a network protocol table wherein the network protocol table includes company information as a data field in the network protocol table for requesting a specific megaco protocol in a case that a protocol standard is not defined;
   c) adding a new protocol in the network protocol table in case that the megaco protocol does not exist in the network protocol table;
   d) searching a specific megaco protocol package in a megaco protocol package list by using a specific package ID and connecting the specific megaco protocol package in case that the megaco protocol exists in the network protocol table, wherein said step d) includes the steps of:
      d1) extracting the specific package ID from the network protocol table and searching the megaco protocol package in the megaco protocol package list by using the specific package ID,
      d2) determining whether the searched megaco protocol package is the specific megaco protocol package, and
      d3) proceeding the process to said step e) in case that the searched megaco protocol package is not the specific megaco protocol package and connecting the specific megaco protocol package in case that the searched megaco protocol package is the specific megaco protocol package; and
   e) installing the megaco protocol package and the specific megaco protocol package and managing the megaco protocol.

* * * * *